United States Patent [19]

Nagano et al.

[11] Patent Number: 4,605,388
[45] Date of Patent: Aug. 12, 1986

[54] SHEET METAL PULLEY FOR TOOTHED BELTS AND MANUFACTURING PROCESS THEREOF

[75] Inventors: Satoshi Nagano; Masanori Sakai, both of Osaka, Japan

[73] Assignee: Tsubakimoto Chain Company, Osaka, Japan

[21] Appl. No.: 742,184

[22] Filed: Jun. 6, 1985

[30] Foreign Application Priority Data

Jun. 12, 1984 [JP] Japan .................... 59-119088

[51] Int. Cl.$^4$ ............................................ F16H 55/17
[52] U.S. Cl. ................................. 474/152; 29/159 R
[58] Field of Search .............. 474/152, 153, 157, 164, 474/165; 29/159 R

[56] References Cited

U.S. PATENT DOCUMENTS

| | | | |
|---|---|---|---|
| 2,923,166 | 2/1960 | Brindley et al. | 474/152 |
| 4,464,949 | 8/1984 | Concina | 474/152 X |

FOREIGN PATENT DOCUMENTS

| | | | |
|---|---|---|---|
| 177457 | 11/1982 | Japan | 474/152 |
| 0118369 | 7/1983 | Japan | 474/152 |
| 0135741 | 8/1983 | Japan | 29/159 R |
| 0193969 | 11/1983 | Japan | 474/152 |

Primary Examiner—James A. Leppink
Assistant Examiner—Thuy M. Bui
Attorney, Agent, or Firm—Dann, Dorfman, Herrell and Skillman

[57] ABSTRACT

A sheet metal pulley having a generally circular base with an upstanding circumferential flange. The flange is formed to provide teeth for engaging a toothed belt. The outer tooth sections are separated by tooth bottom sections and these sections are interconnected by intermediate walls. Reinforcing ribs extend circumferentially on the inside of the outer tooth sections between the intermediate walls on either side thereof. This patent also discloses a method for cold-forging this pulley from a sheet metal cup-like member.

8 Claims, 10 Drawing Figures

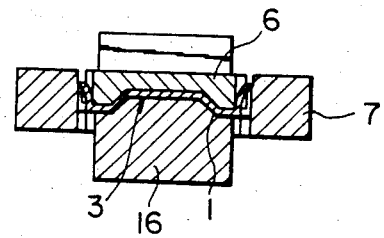
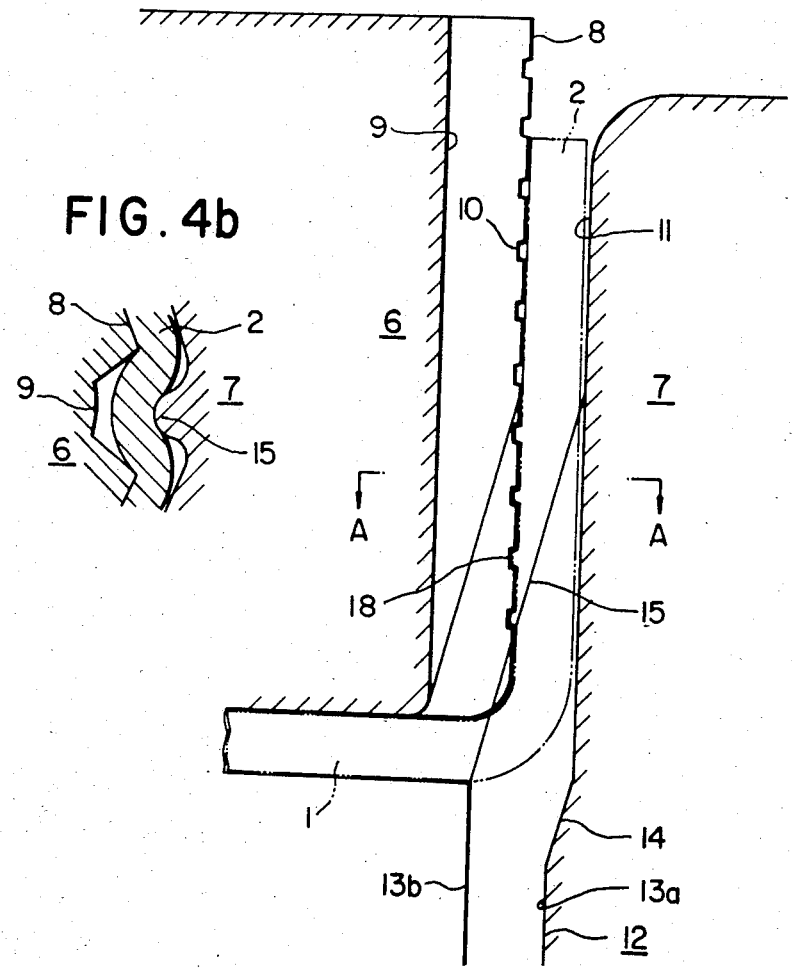

SHEET METAL PULLEY FOR TOOTHED BELTS AND MANUFACTURING PROCESS THEREOF

FIELD OF THE INVENTION

This invention relates to a pulley made of sheet metal for toothed belts and its manufacturing method, in which the rigidity of the toothed section of the pulley is strengthened for tension in toothed belts. A pulley according to the invention is characterized in that both the toothed section and its reinforcing ribs are formed simultaneously by cold forging.

BACKGROUND OF THE INVENTION

A manufacturing method for a pulley made of sheet metal for toothed belts is disclosed in Japanese Patent Laid-Open, No. 177457/1982, which has the disadvantages that for toothed pulleys, the wall thicknesses of both shoulder sections in the pulley tooth section are extended by 60% of their material plate thickness so that a perfect tooth shape is difficult to achieve and the rigidity required for the tension in toothed belts is likely to be insufficient.

An object of the present invention is to solve the above-mentioned disadvantages related to the tooth shape and to the rigidity of conventional pulleys made of sheet metal for toothed belts by simultaneous cold forging from sheet metal of pulleys for toothed belts.

A pulley in this invention is characterized in that the teeth of a pulley for toothed belts are formed by a single cold forging of a metal sheet so as to have a plurality of reinforcing cross-pieces or reinforcing ribs arranged in the circumferential direction which are integral with the pulley and project from the inner surface of the metal sheet which forms the teeth.

Furthermore, the method of manufacturing a pulley according to the invention uses a cup-shaped body which has a generally circular base with a circumferential wall section or upstanding flange which is to form the tooth section of a sheet metal pulley for toothed belts and on which a solid lubrication film is formed. The body is cold-forged in a single operation by means of a punch and die. The punch has convex sections and concave sections matching the shape of the inwardly facing surface of said tooth section and also has a plurality of circumferential grooves cut into said convex sections. The die has an upper cylindrical section into which the circumferential wall section fits and a lower die section in which concave sections and convex sections are formed so that there are clearance gaps relative to said confronting convex and concave sections of the punch that are smaller than the wall thickness of the circumferential wall section. A tapered inclined face is formed between the upper cylindrical section and said lower die section so that as the circumferential section passes the tapered inclined face, it forms the circumferential wall section of the cup body into the tooth section utilizing pressure in the radial direction exerted by the inclined face.

A plurality of the reinforcing crosspieces or ribs project beyond the inner face of the tooth section in a pulley and are formed by displacing or upsetting the material of the sheet metal body into grooves provided on the punch when the circumferential wall section is forcibly pressed radially toward the center by the tapered inclined face. At the same time, while the tooth bottom section is pushed into the concave sections of the punch, the reinforcing crosspieces reduce the reduction in the material thickness because the reinforcing crosspieces or ribs obstruct the material flow axially of a pulley and thereby the reinforcing crosspieces have the effect that the tooth shape is maintained to a desired shape and the rigidity for the tension in a toothed belt is improved.

The solid lubrication film on the cup-shaped body makes material flow easily from the outwardly positioned tooth section and the inwardly positioned tooth bottom section to the intermediate tooth side section when the circumferential wall section or flange is deformed by the tapered inclined face and is pressed against the convex sections of the punch. Since the reinforcing crosspieces formed by the grooves in the punch have a height of about 0.1–0.2 mm, the tooth section can readily be disengaged from the punch after the forging operation due to the elastic deformation of the tooth section. There is, therefore, no problem in separating the work pieces from the die and punch.

BRIEF DESCRIPTION OF THE DRAWINGS

FIGS. 3, 4, and 5 are cross-sectional views of the punch and die in three stages of operation for explaining the cold forging process;

FIG. 4a and FIG. 5a are respectively enlarged longitudinal cross-sectional views of the main sections in FIG. 4 and FIG. 5

FIG. 4b is a cross-sectional view on the line A–A of FIG. 4a;

DETAILED DESCRIPTION OF THE PREFERRED EMBODIMENT

Figure 1:
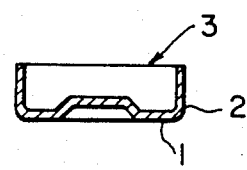
FIG. 1 is a longitudinal cross-sectional view of a cup shaped body used for making the pulley.

To manufacture a pulley made of sheet metal for toothed belts according to the invention a cup-shaped metal sheet from a metal sheet stock that is suited for cold forging is formed by draw forming, and it is subjected to the solid lubrication film treatment that is effective for forming a tooth shape, and then it undergoes the tooth shape forming. For the solid lubrication film a zinc phosphate film to which the lubrication treatment is applied is most suitable, but other treatments, for example, the molten zinc plating or electric zinc plating may give the same effect. The solid lubrication film treatment can also be applied to metal sheet stock or blanks from a stock material. In this case, it will be less expensive than the above-mentioned forming process. A blank first undergoes draw forming to have a cup-shaped body 3 as shown in FIG. 1 which has a base 1 with a raised or offset central portion which may serve as a hub for the pulley and a circumferential wall section or upstanding circumferential flange 2 that is to be formed to provide pulley teeth for use with toothed belts. Next, the brim of the circumferential flange 2 is trimmed. The trimmed portions are not necessarily needed for forming the tooth section.

Figure 2:
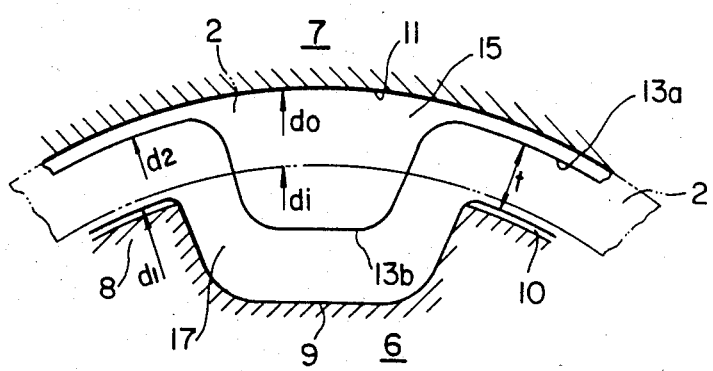
FIG. 2 is a fragmentary enlarged sectional view through the tops of a cold forging punch and die, showing the circumferential flange of the cup shaped body in broken lines.

As shown in FIG. 2 the inner diameter $d_i$ and the outer diameter $d_o$ of the circumferential wall section 2 are made as required beforehand so that $d_i$ is larger than the inner diameter $d_1$ of the pulley tooth section 4 by 0.1–0.2 mm and $d_o$ is larger than the outer diameter $d_2$ of the pulley tooth section 4 by about 1.2 mm.

Next, in order to form a pulley tooth section 4 and a tooth bottom 5 in the circumferential wall section 2, the cup-shaped body 3 is subjected to cold forging by means of a punch 6 and a die 7. If the phosphate film treatment is applied to the cup-shaped body 3 and a lubrication treatment is given to the phosphate film so as to form a metallic soap film to lessen friction during the forging, it is possible to maintain strong lubrication under extreme pressure on the face.

Figure 7:
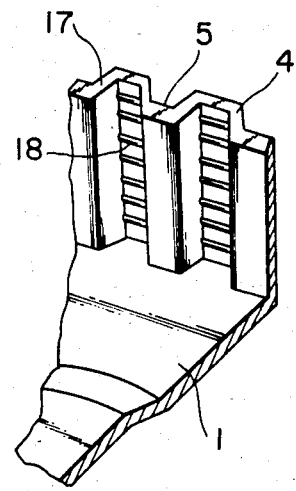
FIG. 7 is a fragmentary perspective view of a completed pulley according the invention.

The punch 6 has on its outer circumferential face convex sections 8 and concave sections 9 that match respectively the internal shapes of the pulley tooth sections 4 and the tooth bottom sections 5 of the completed pulley (see FIG. 7). The convex sections 8 have a large number of grooves 10 cut in the circumferential direction (FIGS. 2 and 4a). A groove 10 may range from 0.05 to 0.20 mm deep and is in the range of 0.5 to 1.0 mm wide and is spaced from the adjacent groove to provide a pitch of about 2-4 mm between centers. The cross section of the groove 10 is trapezoidal as shown, but also may be triangular or saw toothed. The configuration is selected according to ease of formation and the ease of separation from the punch.

The die 7 includes an upper cylindrical section 11 into which the circumferential flange 2 fits and a lower die section 12 formed below the cylindrical section 11 which comprises inwardly-facing concave sections 13a and convex sections 13b which register with the convex and concave shapes of the outer faces of the pulley tooth sections 4 and the pulley tooth bottom sections 5 respectively. Tapered inclined faces 14 and 15 are formed between the cylindrical section 11 and the die section 12. The convex sections 8 and concave sections 9 of the punch register respectively with concave sections 13a and concave sections 13b. The length t (FIG. 2) of the clearance gap between the die section 12 and the punch 6 is set to be smaller than the wall thickness of the circumferential flange 2 by about 0.5 mm. The bottom face of the punch 6 and the upper face of a counter punch 16 are shaped to match the inner and outer surfaces respectively of the offset internal hub portion of the cup-shaped body 1 so that they can not be laterally shifted.

Next, the forming of the pulley tooth section will be explained in reference to FIGS. 3–7.

Figure 3:
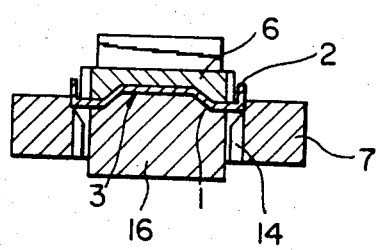
Figure 5:
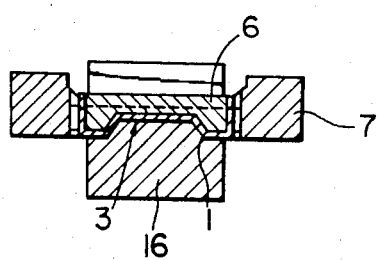
Figure 5A:
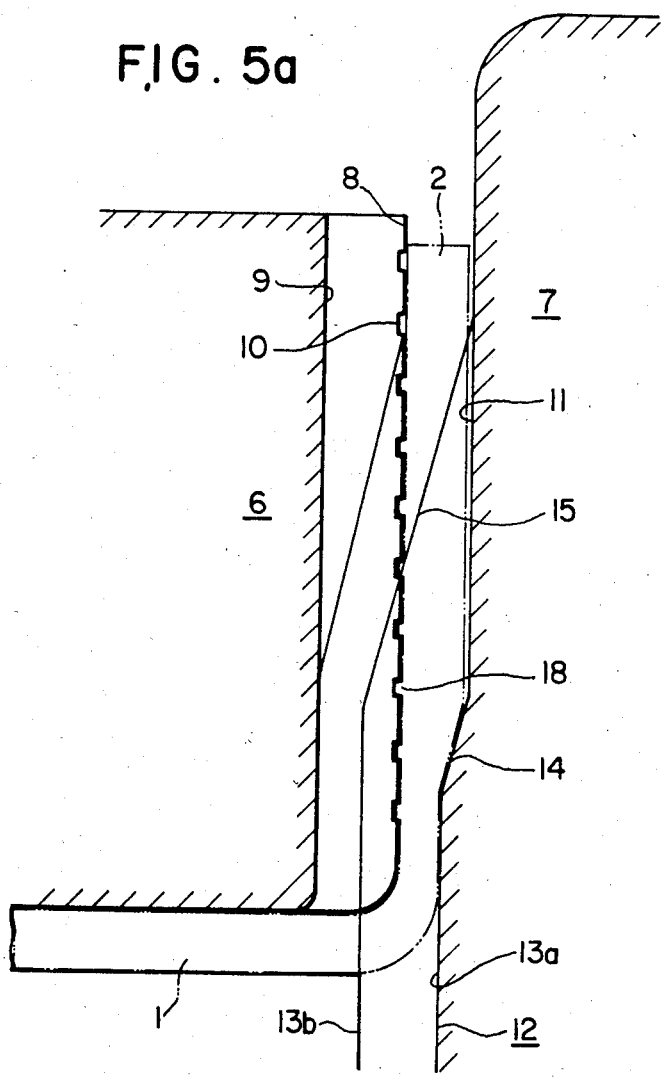

Firstly, the cup-shaped body 3 to which the required solid lubrication film treatment has been applied is placed on the counter-punch 16 and the punch 6 is lowered (FIG. 3). By this punching motion the circumferential flange 2 and the outer circumferential section of the bottom 1 that is adjoining the flange 2 have their appropriate portions pushed toward the center by the inclined face 15 under the friction reducing effects of said sold lubrication film to first form temporarily the shape shown in FIG. 4b. The punch 6 further descends to press the circumferential flange section 2 between the punch 6 on the inside and the die section 12 on the outside.

Figure 6:
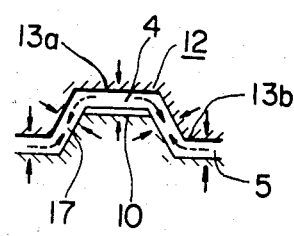
FIG. 6 is a fragmentary plan view for explaining the flow of material during cold forging.

Since, as described above, the gap t is smaller than the wall thickness of the circumferential flange wall 2, the latter and the outer circumferential section of the bottom 1 that adjoins the circumferential section 2 are deformed with partial material flow in the direction of the broken line arrow of FIG. 6 by the pressing action on both sides from the convex sections 8 and concave sections 9 of the punch 6 and the concave and convex sections 13a and 13b of the die section 12 to form the pulley tooth section 4, tooth bottom 5, and an intermediate tooth side section 17 of desired shapes (FIGS. 6 and 7). At the same time the material is displaced into the grooves 10 to form reinforcing crosspieces 18 as shown in FIG. 7 on the inner face of the pulley tooth section 4. Now the cold forming operation is completed. Then when the punch 6 is raised, the punched pulley leaves the die 7 together with the punch 6. Since reinforcing ribs are of small height, and the teeth are subject to resilient deformation, the forged part can be readily separated from the punch 6.

During the above mentioned forging process, the reinforcing crosspieces 18 lessen the flow of the material in that portion of the pulley tooth section 4 which is close to the pulley base 1. As a result, there is less reduction in the wall thickness at the corner section connecting the tooth bottom 1 and the tooth section 4, and the corner wall thickness increases by 20% compared with the case in which reinforcing ribs 18 are not provided, thereby improving pulley strength. At the same time the effective thickness in the radial direction of the tooth section 4 increases to provide a more accurate tooth shape. Further, the reinforcing ribs 18 have the effect that the material flow due to the deforming of the material at the concave sections 13a is diverted in the circumferential direction into the intermediate section 17 assisting the formation of the corner, and thereby the material flow at the junction between the intermediate section 17 and the toothed section 4 is reduced and the shape of the pulley toothed section 4 is improved.

A pulley made of sheet metal in this invention has improved rigidity against deforming in the circumferential direction of the pulley tooth section and in the radial direction toward the center, and better shape and dimensional accuracy in the pulley tooth section due to providing reinforcing ribs at the rear faces of the pulley tooth section. The construction also contributes effectively to reduction of noise that is one of the draw backs of pulleys made of sheet metal. Since the manufacturing method according to the invention employs cold forging to simultaneously form the entire circumferential teeth of a pulley, pulleys for toothed belts can be formed with minimum processing and with improved strength, ideal shape and dimensional accuracy.

The invention can be also applied to components other than pulleys for toothed belts, such as clutch drums, clutch hubs and other machine parts which have an axial length relative to the diameter that is longer than pulleys, and whose elongation in the axial direction can be suppressed. The reinforcing crosspieces or ribs provide crevices which can serve to hold the lubricant.

What is claimed is:

1. A pulley made of sheet metal for toothed belts comprising a cup-shaped body made of sheet metal having inner and outer faces and formed as one body with a generally circular base with a circumferential upstanding flange, said flange having teeth with radially-outward pulley tooth sections spaced apart circumferentially by radially-inward tooth bottom sections, and a plurality of reinforcing crosspiece ribs; said reinforcing ribs being arranged in the circumferential direction and projecting from the inner face of said upstanding flange; and said pulley tooth sections, said tooth bottom sections and said reinforcing crosspieces being integrally formed as one body.

2. A pulley according to claim 1 wherein said flange between the ribs is thinner than said base and said flange including the ribs is thicker than said flange between the ribs.

3. A pulley according to claim 1 wherein said tooth sections are connected to said bottom sections by intermediate walls, said circumferential ribs comprise discontinuous segments extending across the circumferential width of the inner face of the pulley tooth sections and between said intermediate walls.

4. A pulley according to claim 1 wherein the outer faces of the tooth sections and the tooth bottom sections of said flange are smooth and continuous without ribs.

5. The method of manufacturing a pulley made of sheet metal for use with toothed belts comprising the steps of providing a sheet-metal cup-shaped body which has a generally circular base with a circumferential flange section to form belt engaging teeth, said body having a solid lubrication film thereon, cold-forging the pulley in a single operation by means of a punch which has radially-outward facing convex sections and concave sections of a configuration matching the desired inner face shape of said teeth, said punch having a plurality of circumferential grooves cut into at least one of said sections and a die with an upper cylindrical section having an inside diameter to receive said circumferential flange of the cup-shaped body and a lower die section in which concave sections and convex sections are formed with a first clearance gap relative to said convex and concave sections of the punch, said first clearance gap being smaller than the wall thickness of the sheet metal circumferential flange of the body, the clearance gap between said die section and the base of said circumferential grooves being greater than the first clearance gap, and a tapered inclined face between the upper cylindrical wall section and said die section; said method including the step of inserting said punch into said body in the cylindrical section of the die and displacing it into said die section to forge the circumferential flange to form pulley teeth with a plurality of reinforcing crosspiece ribs disposed circumferentially and projecting inwardly from the inner surface of said circumferential flange by the pressure exerted radially upon said circumferential flange when said circumferential flange passes said tapered inclined face.

6. A method according to claim 5 wherein said grooves are confined to said convex sections of the punch and the clearance gap between said tapered section and convex section is smaller than the wall thickness of said flange, so that the material of said flange is upset into said grooves to form said ribs when said punch passes into registry with said tapered inclined face.

7. A method according to claim 5 including the step of trimming the brim of the circumferential flange after the forging step.

8. A method according to claim 5 including the further step of disengaging said punch and said body from the die, and resiliently deforming the formed teeth radially outwardly to disengage said ribs from said grooves.

* * * * *